United States Patent
Arani et al.

(10) Patent No.: US 12,147,502 B2
(45) Date of Patent: Nov. 19, 2024

(54) DIFFERENCING BASED SELF-SUPERVISED PRETRAINING FOR CHANGE DETECTION (D-SSCD)

(71) Applicant: NavInfo Europe B.V., Eindhoven (NL)

(72) Inventors: Elahe Arani, Eindhoven (NL); Vijaya Raghavan Thiruvengadathan Ramkumar, Eindhoven (NL); Bahram Zonooz, Eindhoven (NL)

(73) Assignee: Navinfo Europe B.V., Eindhoven (NL)

( * ) Notice: Subject to any disclaimer, the term of this patent is extended or adjusted under 35 U.S.C. 154(b) by 433 days.

(21) Appl. No.: 17/502,729

(22) Filed: Oct. 15, 2021

(65) Prior Publication Data
US 2023/0123493 A1    Apr. 20, 2023

(51) Int. Cl.
G06F 18/214 (2023.01)
G06F 18/213 (2023.01)
G06F 18/22 (2023.01)
G06N 20/00 (2019.01)
G06V 10/70 (2022.01)
G06V 10/94 (2022.01)
G06V 20/00 (2022.01)

(52) U.S. Cl.
CPC ........ G06F 18/2155 (2023.01); G06F 18/213 (2023.01); G06F 18/22 (2023.01); G06N 20/00 (2019.01); G06V 10/70 (2022.01); G06V 10/95 (2022.01); G06V 20/00 (2022.01)

(58) Field of Classification Search
CPC .... G06F 18/2155; G06F 18/22; G06F 18/213; G06N 20/00; G06V 10/70; G06V 10/95; G06V 20/00
See application file for complete search history.

(56) References Cited

U.S. PATENT DOCUMENTS

| 10,452,947 | B1* | 10/2019 | Ahmed | G06N 3/045 |
| 11,748,988 | B1 | 9/2023 | Chen et al. | |
| 2020/0273192 | A1* | 8/2020 | Cheng | G06V 10/454 |
| 2023/0021661 | A1* | 1/2023 | Bao | G06V 40/16 |
| 2023/0289977 | A1 | 9/2023 | Ramkumar et al. | |

OTHER PUBLICATIONS

Alcantarilla, Pablo F., et al., "Street-View Change Detection with Deconvolutional Networks", Autonomous Robots, vol. 42, No. 7, 2018, 1301-1322.

(Continued)

*Primary Examiner* — Pinalben Patel
(74) *Attorney, Agent, or Firm* — Peacock Law P.C.; Justin R. Muehlmeyer

(57) ABSTRACT

A computer implemented network for executing a self-supervised scene change detection method, wherein at least one image pair with images captured at different instances of time is processed to detect structural changes caused by an appearance or disappearance of an object in the image pair, and wherein a self-supervised pretraining method is employed that utilizes an unlabelled image pair or pairs to learn representations for scene change detection, and wherein the aligned image pair is subjected to a differencing based self-supervised pre-training method to maximize a correlation between changed regions in the images which provide the structural changes that occur in the image pairs.

9 Claims, 1 Drawing Sheet

(56) References Cited

OTHER PUBLICATIONS

Guo, Enqiang, et al., "Learning to Measure Changes: Fully Convolutional Siamese Metric Networks for Scene Change Detection", arXiv:1810.09111v3, 2018, 1-10.
Lei, Yinjie, et al., "Hierarchical Paired Channel Fusion Network for Street Scene Change Detection", arXiv:2010.09925v1, 2020, 1-13.
Sakurada, Ken, et al., "Weakly Supervised Silhouette-based Semantic Scene Change Detection", arXiv:1811.11985v2, 2020, 1-7.
Tung, Frederick, et al., "Similarity-Preserving Knowledge Distillation", arXiv:1907.09682v2, 2019, 1-10.
Chen, Yuxing, et al., "Self-Supervised Change Detection by Fusing SAR and Optical Multi-Temporal Images", 2021 IEEE International Geoscience and Remote Sensing Symposium IGARSS, 2021, 3101-3104.
Chen, Yuxing, et al., "Self-supervised Change Detection in Multi-view Remote Sensing Images", arXiv:2103.05969v1, 2021, 2021.
Chen, Yuxing, et al., "Self-supervised Remote Sensing Images Change Detection at Pixel-level", arXiv:2105.08501v2, 2021, 1-10.
Leenstra, Marrit, et al., "Self-supervised pre-training enhances change detection in Sentinel-2 imagery", arXiv:2101.08122v2, 2021, 1-14.
Ramkumar, Vijaya Raghavan T., et al., "Self-Supervised Pretraining for Scene Change Detection", 35th Conference on Neural Information Processing Systems (NeurIPS 2021), Sydney, Australia, 2021, 1-13.
Deng, Jia, et al., "ImageNet: A Large-Scale Hierarchical Image Database", Conference Paper in Proceedings / CVPR, IEEE Computer Society Conference on Computer Vision and Pattern Recognition. IEEE Computer Society Conference on Computer Vision and Pattern Recognition, 2009, 1-8.
Zbontar, Jure, "Barlow Twins: Self-Supervised Learning via Redundancy Reduction", arXiv:2103.03230v3, 2021, 1-13.

\* cited by examiner

DIFFERENCING BASED SELF-SUPERVISED PRETRAINING FOR CHANGE DETECTION (D-SSCD)

BACKGROUND OF THE INVENTION

Field of the Invention

Embodiments of the present invention relate to a computer implemented network to execute a self-supervised scene change detection method, wherein at least one image pair with images captured at different instances of time is processed to detect structural changes caused by an appearance or disappearance of an object in the image pair, and wherein a self-supervised pretraining method is employed that utilizes an unlabelled image pair or pairs to learn representations for scene change detection.

Scene change detection (SCD) is a critical perception task in the field of computer vision that helps to identify the changes between images of the scene captured at different times. It plays a crucial role in real-world applications such as ecosystem monitoring, urban expansion, remote sensing, damage assessment, and Automotive High-Definition map maintenance. Deep Neural Network (DNNs) based scene change detection methods hinge on the availability of large-scale labelled images. These images and large-scale collection and annotation of SCD datasets are difficult to obtain as they are labour-intensive and time-consuming.

Background Art

To address the dependency on labeled data, various prior art SCD approaches initially pretrain their models on the large-scale ImageNet in a supervised manner and later finetune with large amounts of pixel-level annotations on domain-specific dataset. ImageNet is known from Deng, J., Dong, W., Socher, R., Li, L. J., Li, K. and Fei-Fei, L., 2009, June. ImageNet: A large-scale hierarchical image database. In 2009 IEEE conference on computer vision and pattern recognition (pp. 384 248-255) IEEE.

However, there still exists the problem of domain shift as the distribution of the ImageNet data widely differs from that of SCD datasets. This domain shift leads to the degradation of change detection performance in prior art SCD methods.

BRIEF SUMMARY OF THE INVENTION

Thus, this invention has as an object to reduce the large dependency of these current scene change detection methods based on large-scale labelled data and to avoid the need to pre-train on additional large-scale labelled data.

According to an embodiment of the present invention, a computer implemented network for executing a self-supervised scene change detection method is proposed wherein at least one image pair with images captured at different instances of time is processed to detect structural changes caused by an appearance or disappearance of an object in the image pair, and wherein a self-supervised pretraining method is employed that utilizes an unlabelled aligned image pair or pairs to learn representations for scene change detection, wherein the aligned image pair is subjected to a differencing based self-supervised further training method to maximize a correlation between changed regions in the images which provide the structural changes that occur in the image pairs. Accordingly, the invention relaxes the requirement of large-scale annotated data sets and the need to pre-train on additional large-scale labelled data.

To promote the effectiveness of the method of the invention, random transformations are applied to the image pair to obtain two pairs of augmented images that are subjected to the self-supervised training method to maximize the correlation between changed regions in the images.

It is possible to apply very differing transformations such as may be selected from the group comprising colour distortions, a Gaussian blur, random crop, shot noise, impulse noise, defocus blur, glass blur, motion blur, zoom blur, snow, frost, fog, bright-ness, contrast, elastic transform, pixelate, JPEG compression.

Preferably the augmented pairs of images are processed to provide an output with corresponding feature representations relating to the structural changes in the image pairs.

Suitably a representation of the structural changes is derived by applying absolute feature differencing over the output to provide the changed features.

Embodiments of the invention preferably employ feature differencing to obtain the changed features. However, there are other distance metrics such as Euclidean, cosine, Manhattan distance, or any other distance metric functions which can be used to obtain the change features. The invention therefore also covers the use of other distance metrics to obtain change features.

Further desirably a cross-correlation of the changed features is maximized so as to learn the structural changes between the image pairs.

It is noted that the step of maximizing the cross-correlation of the changed features employs a loss function selected from the group comprising contrastive learning loss function, and Barlow twins loss function. It has however been found preferable that the step of maximizing the cross-correlation of the changed features employs Barlow twins loss function.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings.

DETAILED DESCRIPTION OF THE INVENTION

Scene change detection (SCD) aims to identify a changed region between image pairs captured at different times. To achieve his, the alignment between the radiometric space of the image pairs and low-level features of the change detection network is required. This alignment is challenging as the changed regions are easily affected by noisy changes caused due to seasonal variations and perspective differences.

To facilitate the alignment of low-level features between two images, the network of the invention employs a self-supervised pretraining method that preferably utilizes Barlow twins objective function that implicitly minimizes the differences between the image pairs in the feature space by maximizing the cross-correlation of unchanged regions. It is however explicitly remarked that it is also possible to use other contrastive methods, although the inventors recognize that Barlow twins objective function is preferred in view of its ability to learn robust representations without requirement for large number of negative samples.

Figure 1:
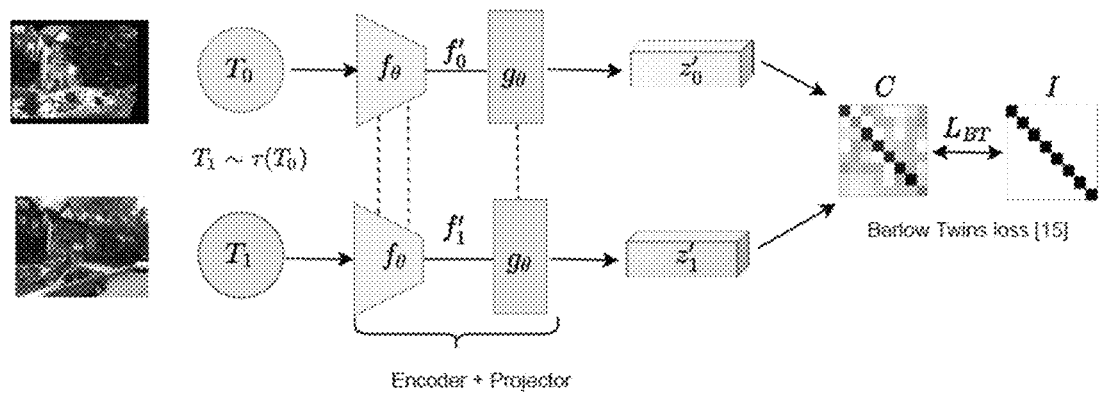
FIG. 1 shows a self-supervised pretraining scheme to learn representation of the unchanged regions by maximizing cross-correlation between two images in the feature space.

Although the image pair captured at a different instances of time (T0 & T1) are semantically different from each other, they both represent the same scene at two different times. Therefore, in the invention T0 is considered an augmented version of the T1 image and vice versa. FIG. 1-top plot shows that these input pairs are fed into a Siamese encoder (f$\theta$), consisting of a Convolutional Neural Network (CNN) with multiple layers, with shared parameters $\theta$ producing feature vectors $f_0'$ and $f_1'$. Then, a non-linear projection head (g$\theta$), consisting of a small Multi-level Perceptron (MLP) layer with non-linear activation functions, is applied over the encoded feature vectors to get representations $z_0'$ and $z_1'$.

The model is trained in a self-supervised manner using the objective function $$L_{BT} \triangleq \underbrace{\sum_i (1-C_{ii}^2)}_{\text{Invariance term}} + \lambda \underbrace{\sum_i \sum_{j \neq i} C_{ij}^2}_{\text{Redundancy reduction term}} \quad (1)$$

$$C_{ij} \triangleq \frac{\sum_b (z_0')_{b,i}(z_1')_{b,j}}{\sqrt{\sum_b ((z_0')_{b,i})^2} \sqrt{\sum_b ((z_1')_{b,j})^2}} \quad (2)$$

wherein $\lambda$ is a trade-off constant, C is the cross-correlation matrix calculated between the representations of the input image pairs (z'0 and z'1) along the batch samples b and i, j index the vector dimension of the network outputs.

This objective function can be derived from Zbontar, J., Jing, L., Misra, I., LeCun, Y. and Deny, S., 2021. Barlow twins: Self-supervised learning via redundancy reduction. arXiv preprint arXiv: 2103.03230.

The objective function consists of two components:
(1) an invariance term that makes the representations of the input image pair (T0, T1) invariant to the presence of noisy changes (e.g., seasonal variations) by maximizing the diagonal components of the cross-correlation matrix close to identity matrix, and
(2) a redundancy reduction term which tries to decorrelate the off-diagonal components of the cross-correlation matrix and thus, aligning the representations of the input image pairs to be similar. Therefore, this approach provides temporal-consistent representations that are useful for the downstream task of scene change detection.

Figure 2:
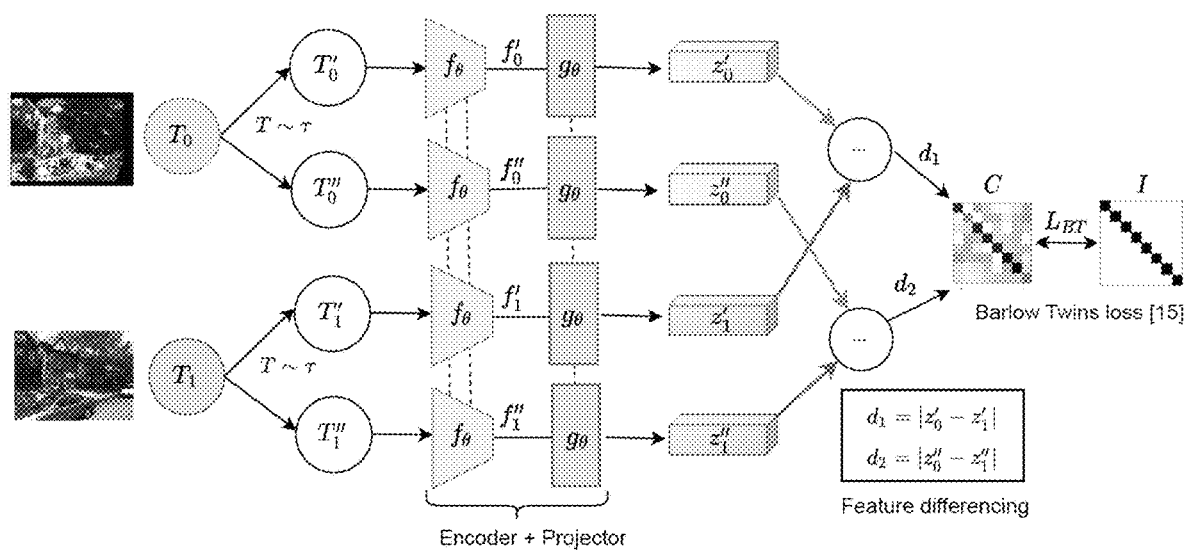
FIG. 2 shows a differencing based scheme representing the computer implemented network for executing the self-supervised pretraining method for scene change detection according to invention.

FIG. 2-bottom relates to maximizing the correlation between two images may affect the discrimination ability of the model in the downstream SCD task as the representations of the two images along with that of the changed regions is forced to be closer together. Therefore, in contrast to the foregoing, where the correlation between the image pair (T0, T1) is increased, in a subsequent step the invention employs a differencing based self-supervised pretraining called D-SSCD that maximizes the correlation of the changed regions to learn distinctive representations that are vital for SCD.

In this step image pairs (T0, T1) are obtained from different time instances as inputs. Random transformations such as colour distortions and Gaussian blur are applied to this input image pair to obtain two pairs of augmented images—FIG. 2 bottom plot.

The augmented image pairs are passed into the Siamese encoder (f$\theta$) and projection head (g$\theta$) to output the corresponding feature representations. Here, the encoder refers to a Convolutional Neural Network (CNN) with multiple layers that helps to extract the information from the images and the projection head refers to a Multi-level Perceptron (MLP) layer with non-linear activation function in between them. The model parameters ($\theta$) are shared. To learn the representation of the changed features between the pair of images, absolute feature differencing is applied over the projection outputs—see FIG. 1, bottom plot:

$$d_1 = |g(f(T_0')) - g(f(T_1'))|$$

$$d_2 = |g(f(T_0'')) - g(f(T_1''))| \quad (3)$$

Then, Barlow twins objective function is applied on the difference representations d1 and d2 to maximize the cross-correlation of the changed features. In this way, the model will pursue to learn the non-redundant information about the relevant changes that occur between the image pairs.

Finally, the encoder representations learned in this manner from the unlabelled image pairs are transferred to the downstream task of scene change detection for identifying the structural changes between the image pairs. In the downstream task of scene change detection, the encoder representations learned from the differencing based self-supervised pretraining (D-SSCD) is transferred to the existing SCD methods wherein the same encoder along with its learned representation is further retrained with a limited quantity of annotated image pairs.

Embodiments of the present invention can include every combination of features that are disclosed herein independently from each other. Although the invention has been discussed in the foregoing with reference to an exemplary embodiment of the method of the invention, the invention is not restricted to this particular embodiment which can be varied in many ways without departing from the invention. The discussed exemplary embodiment shall therefore not be used to construe the appended claims strictly in accordance therewith. On the contrary the embodiment is merely intended to explain the wording of the appended claims without intent to limit the claims to this exemplary embodiment. The scope of protection of the invention shall therefore be construed in accordance with the appended claims only, wherein a possible ambiguity in the wording of the claims shall be resolved using this exemplary embodiment. Variations and modifications of the present invention will be obvious to those skilled in the art and it is intended to cover in the appended claims all such modifications and equivalents. The entire disclosures of all references, applications, patents, and publications cited above are hereby incorporated by reference. Unless specifically stated as being "essential" above, none of the various components or the interrelationship thereof are essential to the operation of the invention. Rather, desirable results can be achieved by substituting various components and/or reconfiguration of their relationships with one another.

Optionally, embodiments of the present invention can include a general or specific purpose computer or distributed system programmed with computer software implementing steps described above, which computer software may be in any appropriate computer language, including but not limited to C++, FORTRAN, BASIC, Java, Python, Linux, assembly language, microcode, distributed programming languages, etc. The apparatus may also include a plurality of such computers/distributed systems (e.g., connected over the Internet and/or one or more intranets) in a variety of hardware implementations. For example, data processing can be performed by an appropriately programmed microprocessor, computing cloud, Application Specific Integrated Circuit (ASIC), Field Programmable Gate Array (FPGA), or the like, in conjunction with appropriate memory, network, and bus elements. One or more processors and/or microcontrollers can operate via instructions of the computer code and the software is preferably stored on one or more tangible non-transitive memory-storage devices.

The invention claimed is:

1. A method for self-supervised scene change detection being performed by one or more computer processors in a computer implemented network, the method comprising:
processing at least one image pair with images captured at different instances of time to detect structural changes caused by an appearance or disappearance of an object in the image pair;
employing a self-supervised pretraining method that utilizes an unlabelled aligned image pair to learn representations for scene change detection; and
subjecting the unlabelled aligned image pair to a differencing based self-supervised further training method to maximize a correlation between changed regions in the images which provide the structural changes that occur in the image pairs.

2. The method of claim 1, further comprising applying random transformations to the image pair to obtain two pairs of augmented images that are subjected to the self-supervised further training method to maximize the correlation between changed regions in the images.

3. The method of claim 2, further comprising applying the random transformations to the image pair that are selected from the group consisting of: colour distortions, random crop, a Gaussian blur, shot noise, impulse noise, defocus blur, glass blur, motion blur, zoom blur, snow, frost, fog, brightness, contrast, elastic transform, pixelate, and JPEG compression.

4. The method of claim 2, further comprising processing the augmented pairs of images to provide an output with corresponding feature representations relating to the structural changes in the image pairs.

5. The method of claim 4, further comprising deriving a representation of the structural changes by applying absolute feature differencing over the output to provide the changed features.

6. The method of claim 5, further comprising maximizing a cross-correlation of the changed features to learn the structural changes between the image pairs.

7. The method of claim 6, wherein the step of maximizing the cross-correlation of the changed features employs Euclidean, cosine, Manhattan distance, or any other distance metric functions which can be used to obtain the changed features.

8. The method of claim 6, wherein the step of maximizing the cross-correlation of the changed features employs a loss function selected from the group comprising a contrastive learning loss function, and Barlow twins loss function.

9. A non-transitory computer-readable medium that stores instructions, executable by one or more processors, to cause the one or more processors to perform operations that comprise the method of claim 1.

* * * * *